Nov. 21, 1933.  G. P. ADAMSON  1,936,078
PROCESS OF PURIFYING HYDROCHLORIC ACID GAS
Filed Dec. 9, 1926
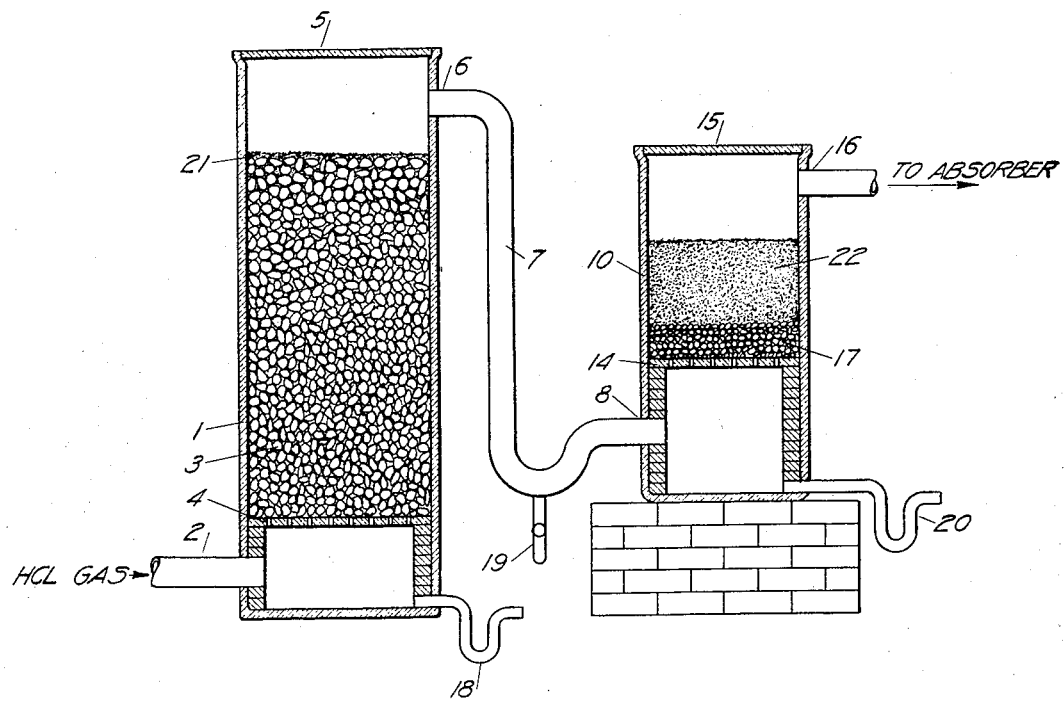
INVENTOR
GEORGE P. ADAMSON
BY
ATTORNEY Patented Nov. 21, 1933

1,936,078

UNITED STATES PATENT OFFICE 1,936,078

PROCESS OF PURIFYING HYDROCHLORIC ACID GAS

George P. Adamson, Huntington, N. Y., assignor to General Chemical Company, New York, N. Y., a corporation of New York Application December 9, 1926. Serial No. 153,479

17 Claims. (Cl. 23—154)

This invention relates to a process of purifying hydrochloric acid gas, and particularly to a process for removing arsenical impurities from such gas.

An object of the invention is the provision of a process adapted to commercial use in which arsenical impurities in hydrochloric acid gas may be completely removed or reduced to a point such that the resulting product is sufficiently free of arsenic to satisfy the requirements of chemically pure acid. A further object of the invention is the provision of such a process in which impurities will not be introduced into the acid during the purification treatment.

In the production of hydrochloric acid, particularly by the well-known process employing the interaction of salt (NaCl) and sulfuric acid, considerable amounts of arsenical impurities are introduced into the evolved hydrochloric acid gas. Arsenic is usually present in commercial sulfuric acid and inevitably a considerable portion of this arsenic finds its way into the hydrochloric acid gas. In addition, arsenic is frequently evolved in noticeable amounts from the cast iron retort or furnace in which the reaction between salt and sulfuric acid is caused to take place. Arsenic is objectionable in hydrochloric acid for many purposes, as in the preparation of food products, in pickling, and in chemically pure acid. The preparation of arsenic free acid by present known processes requires the use of arsenic free raw materials, redistillation of the product, or other expensive manufacturing processes. Accordingly it is highly desirable to provide a process adapted for commercial application to the purification of large quantities of hydrochloric acid gas.

I have discovered that arsenic, in the form present in hydrochloric acid gas, which is probably principally arsenious chloride, may be completely removed from gaseous hydrochloric acid by passing the gas in contact with a material having high adsorptive properties, such as silica gel, activated carbon, activated bauxite, or a good grade of wood charcoal. The arsenical impurities are selectively adsorbed from the gas stream without removing appreciable quantities of the acid. As the amount of adsorbing material required to purify a large volume of gas is relatively small and as the improvement may be applied to existing systems without any considerable modification of the system or increased cost of operation, the improved process affords ready means for accomplishing the results desired.

In the accompanying drawing I have diagrammatically illustrated an apparatus employing activated carbon as the adsorbing medium for applying my improved process to a hydrochloric acid system.

As above stated, hydrochloric acid is generally produced by the interaction of sulfuric acid and an inorganic metal chloride, usually sodium chloride, under the influence of heat in a suitable furnace. The evolved hydrochloric acid gas is then conducted from the furnace and led through a suitable cooling and absorption (condensing) system. When producing commercial hydrochloric acid it is generally sufficient to cool the gas and then absorb directly in water. When producing a more pure acid it, of course, becomes necessary to subject the gas to a more elaborate purification treatment under such conditions that foreign impurities will not be introduced into the acid during the treatment. The gas is generally cooled in earthenware or silica coolers. These coolers serve the double purpose of lowering the temperature of the gas to a point at which efficient absorption of the gas in water becomes possible, and also of condensing out considerable amounts of water vapor and sulfuric acid. Following this cooling stage the temperature of the gas will generally be in the neighborhood of 100°–160° F. I then prefer to pass the gas through a suitable type of coke tower to remove sulfuric acid mist by the intensive filtering action obtained within the tower. In the drawing I have illustrated a tower 1 which is suitable for this purpose, preferably constructed of earthenware or other material adapted to withstand the action of hydrochloric acid without introducing foreign matter into the acid. The hydrochloric acid gas from the cooling system enters the tower at the bottom through the inlet 2. Within the tower there is a bed of coke 3, supported upon a suitable earthenware grill 4. The upper section of the tower is provided with a removable top 5, and a gas outlet 6, which communicates through earthenware or silica piping 7, to the inlet 8 of the vessel 10 containing the adsorbing material.

The temperature of the gas will be reduced somewhat in passing through the coke tower, generally issuing therefrom at about atmospheric temperature, or below 100° F. It is of course desirable to lower the temperature of the gas as far as possible in order that a high absorption efficiency may be obtained in the subsequent absorption (condensing) apparatus. During the winter months the temperature of the gas will frequently fall to around 40°–60° F. I have found that temperatures not substantially above 100° F. are also desirable for the adsorption step, particularly with certain of the adsorbing media. For instance, activated carbon appears to be entirely effective at temperatures as high as 200° F. However, the efficiency of silica gel, activated bauxite and charcoal appears to drop off at this temperature, the upper limit for effective adsorption being around 150° F. and preferably not over 100° F.

Having been cooled and filtered, the gas is now passed to the vessel 10 containing the adsorbing material. This vessel is likewise constructed of earthenware or suitable acid resistant material and is provided with an earthenware grill 14, for supporting the adsorbing material. Upon the earthenware grill 14 I preferably place a rather thin layer of medium sized coke 17, and upon this a bed of activated carbon 22. The particular type of activated carbon and size of the particles is relatively immaterial, except that I find that a comparatively small granular particle affords excellent adsorption with small resistance to gas flow through the filter. The carbon should be removed and replaced by fresh material, or purified in position, at intervals whenever the amount of arsenic remaining in the gas exceeds whatever value is permissible in the product acid.

The upper section of the vessel 10 is provided with a removable top 15, and a gas outlet 16 leading to the absorption (condensing) system in which the purified hydrochloric acid gas is absorbed in water to produce chemically pure acid.

Any type of absorber which will not introduce impurities into the acid may be employed for absorbing the purified hydrochloric acid gas.

Suitable drains 18, 19 and 20, are provided at the base of the coke tower and filter and in the gas line leading from the coke tower to the filter for condensed acid.

The gas in passing through the coke tower will be subjected to an intensive filtering action, and the sulfuric acid mist carried thereby will be removed and withdrawn through the drain 18. The gas, now purified of sulfuric acid mist and all foreign particles carried in suspension, passes through the bed of activated carbon which completely removes the arsenical impurities carried by the gas. As above stated, the amount of arsenic removed will depend somewhat upon the amount of activated carbon through which the gas is passed, but I have found that a substantially complete removal can be effected with a relatively small quantity of carbon.

As examples of commercial types of activated carbon which I have used I may give "Columbia" carbon and "Norite" carbon. The following will serve as an illustrative example of actual conditions prevailing in the application of my invention to the purification from arsenic of hydrochloric acid gas produced from commercial salt and commercial contact process sulfuric acid, by interaction in a cast iron retort. In the vessel 10, having a diameter of about 36 inches, was first placed a layer of small sized coke. Upon this was placed an 8 inch layer of "Norite" activated carbon of ¼ to ½ inch particles. This amounted to about 50 lbs. Through this amount of material was passed about 32,000 cu. ft. of hydrochloric acid gas per day at substantially atmospheric temperature. The gas contained about 90% hydrochloric acid gas, the remainder being air and water vapor. The condensed acid was practically arsenic free, the average arsenic content being below the requirements of the American Chemical Society for chemically pure acid, i. e., below 0.00001% As. At the end of a 15 day period the efficiency of the activated carbon had dropped to a point such that the product was not satisfactory for C. P. acid, whereupon it became necessary to replace the lot with fresh material.

In the above example contact process sulfuric acid was used, which is relatively free of arsenic as compared to chamber acid. It would of course be necessary to use larger amounts of activated carbon, or renew it more frequently, if chamber acid were used.

As a modified manner of bringing the hydrochloric acid gas in contact with activated carbon I may find it desirable to coat the coke particles within the coke tower 1, with a surface layer of activated carbon. This may be effected by preparing a suspension of powdered activated carbon in water and pouring this liquid into the top of the coke tower.

In this manner a thin film of activated carbon having a large effective surface area is provided and gives excellent results with but a small quantity of activated carbon. I have illustrated this method of treatment in the drawing by indicating a thin layer of activated carbon 21, upon the upper layers of coke particles 3 within the tower 1. This system of treatment may be used as auxiliary to the treatment of the gas with a bed of activated carbon, or may entirely supplant the separate adsorbing treatment, i. e. the steps of filtering and adsorption may be combined.

The other adsorbing materials mentioned above, may likewise be used similarly to the activated carbon. The activated bauxite which I have mentioned is a material obtained by slowly heating a good grade of natural bauxite to about 450° F. and then igniting at this temperature until substantially complete dehydration is obtained, which will ordinarily require about four hours. When using silica gel or activated bauxite, care should be taken that the gas does not contain sufficient moisture to cause a condensation of water or acid on the material. Silica gel has a tendency to decompose in the presence of water or even strong liquid hydrochloric acid and bauxite to a lesser extent. If the gas is quite wet, it may be dried by passing it in contact with strong sulfuric acid. Charcoal is not as efficient as activated carbon or silica gel, i. e. a larger amount by weight of material must be used to obtain equivalent purification, but its lower cost makes it desirable in some instances.

The term "material having high adsorptive properties" as used in the claims is intended to cover materials having adsorptive properties comparable to the substances described herein as illustrative examples of the practice of my invention, i. e., comparable to silica gel, activated carbon, activated bauxite or charcoal, and I desire it to be understood that I do not confine my invention to the use of these exact materials. By the term "sulfuric acid" I intend to cover equivalents, as for example nitre cake, i. e., sodium acid sulfate, which contains considerable available free sulfuric acid.

I claim:

1. The process of removing arsenical impurities from hydrochloric acid gas which consists in passing said gas in contact with a material having high adsorptive properties.

2. The process of removing arsenical impurities from hydrochloric acid gas which consists in passing said gas at a temperature below 150° F. in contact with a material having high adsorptive properties.

3. The process of purifying hydrochloric acid gas produced by the interaction of sulfuric acid and a chloride which consists in passing said gas at a temperature below 150° F. in contact with a material having high adsorptive properties.

4. The process of purifying hydrochloric acid gas containing arsenical impurities, and produced by the interaction of sulfuric acid and a chloride, which comprises subjecting said gas to a filtering operation to remove suspended particles and sulfuric acid mist, and then passing said gas at a temperature below 150° in contact with a material having high adsorptive properties.

5. The process of removing arsenical impurities from hydrochloric acid gas which consists in passing said gas in contact with an adsorbent of the group consisting of activated carbon, silica gel, activated bauxite, and charcoal, and renewing said substances whenever the arsenic content of the purified gas exceeds a predetermined amount.

6. The process of removing arsenical impurities from hydrochloric acid gas which consists in passing said gas in contact with activated carbon.

7. The process of removing arsenical impurities from hydrochloric acid gas which consists in passing said gas, at a temperature below 150° F. in contact with silica gel.

8. The process of removing arsenical impurities from hydrochloric acid gas which consists in passing said gas, at a temperature below 150° F. in contact with activated bauxite.

9. In the process of producing pure hydrochloric acid by the decomposition of an inorganic chloride comprising treating said chloride with sulfuric acid to liberate hydrochloric acid gas, and cooling said gas, the improvement which comprises filtering said gas to remove suspended particles and sulfuric acid mist, passing said gas in contact with a material having high adsorptive properties, and then absorbing said gas to produce liquid hydrochloric acid.

10. In the process of producing pure hydrochloric acid by the decomposition of an inorganic chloride involving treating said chloride with sulfuric acid to liberate hydrochloric acid gas, the improvement which comprises cooling said gas to a temperature not substantially over 200° F., filtering said gas to remove suspended particles and sulfuric acid mist, passing said gas in contact with activated carbon, and then absorbing said gas to produce liquid hydrochloric acid.

11. The process which comprises removing arsenical impurities from hydrochloric acid gas containing said impurities by contacting the gas with an adsorbent of the group consisting of activated carbon, silica gel, activated bauxite, and charcoal.

12. The process which comprises removing arsenical impurities from hydrochloric acid gas by contacting the gas with a material having high adsorptive properties, and renewing said material whenever the arsenic content of the purified acid exceeds a predetermined amount.

13. In the process of producing pure hydrochloric acid by the decomposition of an inorganic chloride with an acid, the improvement which comprises purifying the gas by contacting the said gas with a material having high adsorptive properties.

14. The process of removing arsenical impurities from hydrochloric acid gas which consists in passing said gas in contact with silica gel.

15. The process of removing arsenical impurities from hydrochloric acid gas which consists in passing said gas in contact with activated bauxite.

16. The process of removing chloride of arsenic from gas containing the same in small amounts which consists in passing said gas in contact with a material having high adsorptive properties.

17. The process of removing chloride of arsenic from gas containing the same in small amounts which comprises passing the said gas in contact with a material having the property of selectively adsorbing chloride of arsenic from said gas.

GEORGE P. ADAMSON.